(12) United States Patent
Hergenrother et al.

(10) Patent No.: US 6,183,870 B1
(45) Date of Patent: Feb. 6, 2001

(54) COATING COMPOSITIONS CONTAINING POLYISOCYANATES AND ASPARTATE-TERMINATED UREA/URETHANE PREPOLYMERS

(75) Inventors: P. Richard Hergenrother, Gibsonia; Lyubov K. Gindin, Pittsburgh; Richard R. Roesler, Wexford; Edward P. Squiller, Pittsburgh, all of PA (US)

(73) Assignee: Bayer Corporation, Pittsburgh, PA (US)

( * ) Notice: Under 35 U.S.C. 154(b), the term of this patent shall be extended for 0 days.

(21) Appl. No.: 09/389,859

(22) Filed: Sep. 2, 1999

(51) Int. Cl.[7] .............................. B32B 27/00; C08G 18/10
(52) U.S. Cl. .................... 428/423.1; 528/59; 528/61; 528/65; 528/67; 528/68; 528/76; 528/80; 528/83
(58) Field of Search ..................... 528/335, 59, 61, 528/65, 67, 68, 76, 80, 83; 428/423.1

(56) References Cited
U.S. PATENT DOCUMENTS 5,126,170   6/1992   Zwiener et al. .................. 427/385.5
5,236,741   8/1993   Zwiener et al. .................. 427/385.5

Primary Examiner—Samuel A. Acquah
(74) Attorney, Agent, or Firm—Joseph C. Gil; Thomas W. Roy

(57) ABSTRACT

The present invention relates to coating compositions containing
   a) 15 to 35% by weight, based on the weight of components a) and b), of aspartate-terminated urea/urethane prepolymers that are based on the reaction products of
      i) NCO prepolymers having a functionality of 1.8 to 2.2 and based on linear or branched aliphatic diisocyanates and
      ii) diaspartates prepared from linear or branched aliphatic diamines,
   b) 65 to 85% by weight, based on the weight of components a) and b), of diaspartate ii) and
   c) a polyisocyanate adduct prepared from aliphatic diisocyanates and having an average functionality of 2.8 to 3.1,
wherein components a), b) and c) are present in amounts sufficient to provide an equivalent ratio of aspartate groups to isocyanate groups of 1.2:1 to 1.0:1.3.
The present invention also relates to coatings prepared from these coating compositions.

17 Claims, 1 Drawing Sheet

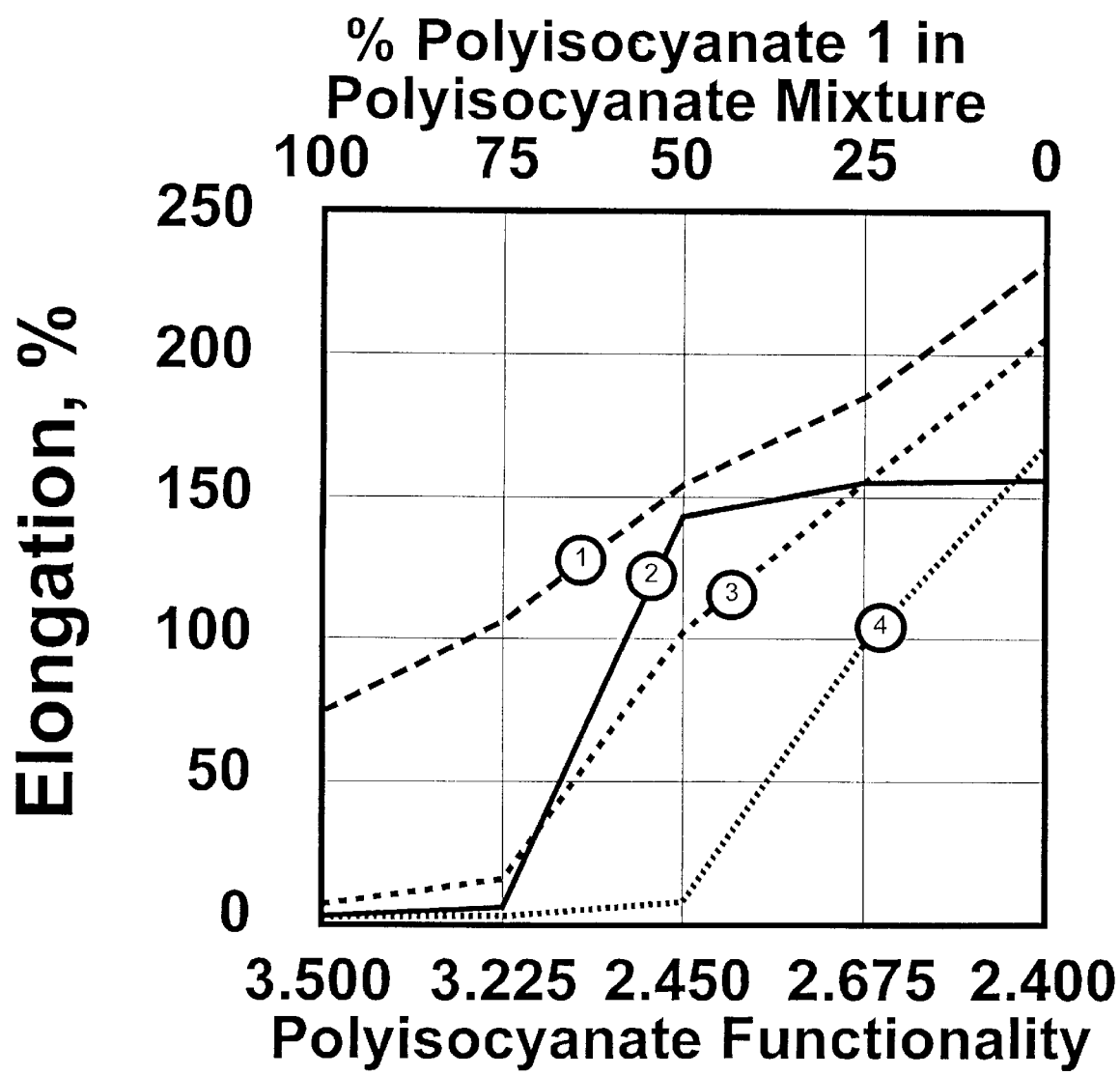

COATING COMPOSITIONS CONTAINING POLYISOCYANATES AND ASPARTATE-TERMINATED UREA/URETHANE PREPOLYMERS

BACKGROUND OF THE INVENTION

1. Field of the Invention

The present invention relates to coating compositions containing polyisocyanates and aspartate-terminated urea/urethane prepolymers, which may be cured to provide coatings having improved flexibility.

2. Description of the Prior Art

The reaction of polyaspartates with polyisocyanates to form polyurea coatings is disclosed in U.S. Pat. Nos. 5,126, 170 and 5,236,741. The polyisocyanates are blended with polyaspartates and then reacted after the mixture has been applied to a suitable substrate to form a urea group-containing coating.

One of the deficiencies of these coatings is that they do not possess good flexibility, primarily because both of the reaction components are low molecular weight compounds. The reaction of these components results in a high concentration of urea groups, so-called "hard blocks," which are known to result in rigid coatings.

One possibility for increasing the flexibility of the coatings is to blend the polyaspartates with the known high molecular weight polyols. However, when these systems are cured the coatings obtained have a waxy feel, which makes them unsuitable for commercial applications. It is believed that this is caused by the fact that aspartate groups react with isocyanate groups much faster than hydroxy groups. Therefore, during the curing process the polyisocyanates react with the aspartates, which hardens the coatings to such an extent that the isocyanate groups cannot react with the hydroxy groups of the polyol component. The polyols remain in the cured coating as a plasticizer resulting in a waxy feel.

One method of overcoming this difficulty is to prereact the polyol with the polyisocyanate to form an NCO prepolymer. The prepolymer can then be reacted with the polyaspartate to form a fully cured coating composition. One disadvantage of this process is that unreacted monomeric polyisocyanate is also present in the NCO prepolymer. To remove this free monomer, which is necessary for environmental reasons, requires an expensive stripping process.

Copending application, overcomes the need for removing unreacted monomer by reacting the NCO prepolymers and any free monomer with polyaspartates to convert the NCO prepolymers to an aspartate-terminated urea prepolymers. These prepolymers can subsequently be reacted with a polyisocyanates to form coatings.

Even though the coatings obtained in the copending application have increased flexibility, it is an object of the present invention to further improve the flexibility of these coating, while maintaining the high crosslink density of the coatings.

This object can be achieved with the coating compositions according to the present invention that are described hereinafter. The coating compositions contain aspartate-terminated urea/urethane prepolymers, excess polyaspartates and polyisocyanates having a specific range of NCO functionalities. By using these specific coating compositions it is possible to obtain an additional increase in flexibility without sacrificing the other valuable properties of polyurethane coatings. The use of higher functionality polyisocyanates leads to an increase in the crosslink density of the coatings, which results, e.g., in excellent chemical and solvent resistance.

SUMMARY OF THE INVENTION

The present invention relates to coating compositions containing
a) 10 to 22% by weight, based on the weight of components a) and b), of aspartate-terminated urea/urethane prepolymers that are based on the reaction products of
  i) NCO prepolymers having a functionality of 1.8 to 2.2 and based on linear or branched aliphatic diisocyanates and
  ii) compounds corresponding to formula I

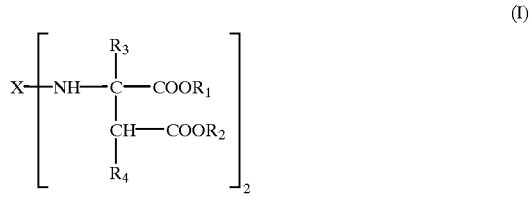

wherein
  x represents the residue obtained by removing the amino groups from a linear or branched aliphatic diamine,
  $R_1$ and $R_2$ may be identical or different and represent organic groups which are inert towards isocyanate groups at a temperature of 100° C. or less and
  $R_3$ and $R_4$ may be identical or different and represent hydrogen or organic groups which are inert towards isocyanate groups at a temperature of 100° C. or less,
b) 78 to 90% by weight, based on the weight of components a) and b), of a compound corresponding to formula I, and
c) a polyisocyanate adduct prepared from aliphatic diisocyanates and having an average functionality of 2.8 to 3.1,
wherein components a), b) and c) are present in amounts sufficient to provide an equivalent ratio of aspartate groups to isocyanate groups of 1.2:1 to 1.0:1.3.

The present invention also relates to coatings prepared from these coating composition

BRIEF DESCRIPTION OF THE DRAWINGS

The FIGURE represents a graph showing the change in elongation versus the functionality of the polyisocyanate component.

DETAILED DESCRIPTION OF THE INVENTION

The aspartate-terminated urea/urethane prepolymers may be prepared by reacting NCO prepolymers with an excess amount of a polyaspartate corresponding to formula I. The NCO prepolymers are prepared by reacting an aliphatic diisocyanate with a high molecular weight polyol, and optionally a low molecular weight alcohol. The NCO prepolymers have an average functionality of 1.8 to 2.2, preferably 2.

Suitable aliphatic diisocyanates include 1,4-tetramethylene diisocyanate, 1,6-hexamethylene diisocyanate and 2,2,4-trimethyl-1,6-hexamethylene diisocyanate. 1,6-hexamethylene diisocyanate is most preferred.

Suitable isocyanate-reactive components for preparing the NCO prepolymers include organic compounds containing at least two hydroxy groups. These organic compounds include high molecular weight polyols having molecular weights of 500 to about 10,000, preferably 800 to about 8,000, and more preferably 1800 to 8,000, and optionally low molecular weight alcohols having molecular weights below 500. The molecular weights are number average molecular weights ($M_n$) and are determined by end group analysis (OH and/or NH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols.

Examples of suitable high molecular weight polyhydroxyl compounds include polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-ε-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N—H bonds and mixtures thereof. Suitable alkylene oxides for the alkoxylation reaction are preferably ethylene oxide, propylene oxide and/or tetrahydrofuran, which may be used in sequence or in admixture. Tetrahydrofuran is most preferred.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

The NCO prepolymers preferably have an isocyanate content of 0.3 to 35% by weight, more preferably 0.6 to 25% by weight and most preferably 1.2 to 20% by weight. The NCO prepolymers are produced by reacting the polyisocyanates, preferably monomeric diisocyanates, with the polyol component at a temperature of 40 to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

To prepare the aspartate-terminated prepolymers, the previously described NCO prepolymers are reacted with compounds corresponding to formula I:

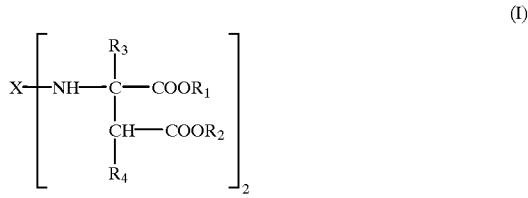

wherein

X represents the residue obtained by removing the amino groups from a linear or branched aliphatic diamine, $R_1$ and $R_2$ are identical or different and represent organic groups which are inert to isocyanate groups at a temperature of 100° C. or less, preferably alkyl groups having 1 to 9 carbon atoms, more preferably methyl, ethyl or butyl groups $R_3$ and $R_4$ may be identical or different and represent hydrogen or organic groups which are inert towards isocyanate groups at a temperature of 100° C. or less, preferably hydrogen and n represents an integer with a value of at least 2, preferably 2 to 4 and more preferably 2.

With regard to preceding definitions $R_1$ and $R_2$ may be different when the polyaspartates are prepared from mixed maleates, such as methylethyl maleate. In addition, one $R_1$ may be different from another $R_1$. For example, when a mixture of maleates, e.g. dimethyl and diethyl maleate, is used to prepare the polyaspartate, one pair of $R_1$ and $R_2$ groups will be methyl and the other will be ethyl.

The polyaspartates may be prepared in known manner as described in U.S. Pat. No. 5,126,170, herein incorporated by reference by reacting the corresponding primary polyamines corresponding to the formula

with optionally substituted maleic or fumaric acid esters corresponding to the formula

Suitable diamines, which may optionally contain ether groups, include ethylene diamine, 1,2-diamino-propane, 1,4-diaminobutane, 1,3-diaminopentane, 1,6-diaminohexane, 2-methyl-1,5-pentane diamine, 2,5-diamino-2,5-dimethylhexane, 2,2,4- and /or 2,4,4-trimethyl-1,6-diaminohexane, 1,11-diaminoundecane, 1,12-diaminododecane and ether containing diamines, such as Jeffamine D-230 (available from Huntsman). Preferred are 1,4-diaminobutane, 1,6-diaminohexane and 2-methyl-1,5-pentane diamine.

Examples of optionally substituted maleic or fumaric acid esters suitable for use in the preparation of the compounds corresponding to formula I include dimethyl, diethyl and di-n-butyl esters of maleic acid and fumaric acid, the previously discussed mixed maleates and fumarates, and the corresponding maleic or fumaric acid esters substituted by methyl in the 2- and/or 3-position.

The aspartate-terminated urea/urethane prepolymers according to the invention are prepared by reacting the NCO prepolymers with a sufficient amount of the polyaspartates to provide a reaction product containing 10 to 22%, preferably 11 to 19% and more preferably 12 to 16% by weight of aspartate-terminated prepolymers a) and 78 to 90%, preferably 81 to 89% and more preferably 84 to 88% by weight of excess polyaspartates b), wherein these percentages are based on the weight of components a) and b). Alternatively, the reaction could be conducted with either no excess or a smaller excess of polyaspartate and the remaining amount could be added after the reaction. However, this is not preferred.

The reaction is preferably carried out by incrementally adding the polyisocyanate to the polyaspartate. After the reaction of the excess polyaspartates remain in the aspartate-terminated prepolymers and function as a reactive diluent. When excess polyaspartate is present during the reaction, it reduces the formation of higher molecular weight oligomers.

At low reaction temperatures of 10 to 100° C., preferably 20 to 80° C. and more preferably 20 to 50° C., the aspartate groups react with isocyanate groups to form urea groups. The urea groups may be converted to hydantoin groups in known manner either by heating the compounds at elevated temperatures, optionally in the presence of an acidic or basic catalyst, or after storage under ambient conditions. Therefore, the term "urea groups" is also intended to include other compounds containing the group, N—CO—N, such as hydantoin groups.

The conversion of urea groups to hydantoin groups is accelerated at temperatures of 60 to 240° C., preferably 80 to 160° C. and more preferably 100 to 140° C. The hydantoin groups are formed with the elimination of a monoalcohol. Instead of forming the urea groups and hydantoin groups in two steps, the reaction may be carried out entirely at elevated temperatures in order to form the urea groups and hydantoin groups in one step.

In accordance with the present invention it is preferred to convert urea groups to hydantoin groups at elevated temperatures before the aspartate-terminated prepolymer is mixed with a polyisocyanate. Under these conditions the monoalcohol may be removed from the prepolymer, which prevents it from reacting with polyisocyanates that are subsequently added.

To prepare the two-component coating compositions according to the invention the aspartate-terminated urea/urethane prepolymers are used in combination with polyisocyanate adducts, which have an average isocyanate functionality of 2.8 to 3.1, preferably 2.85 to 3.05 and more preferably 2.9 to 3.0. Suitable polyisocyanate adducts are those containing isocyanurate, uretdione, biuret, urethane, allophanate, iminooxadiazine dione, carbodiimide and/or oxadiazinetrione groups. The polyisocyanates adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are those containing isocyanurate, uretdione, biuret, iminooxadiazine dione and/or allophanate groups. Mixtures of polyisocyanate adducts having various functionalities may be used, provided that the mixtures have an average functionality within the necessary range. The aspartate-terminated prepolymers are mixed with the polyisocyanates in amounts sufficient to provide an equivalent ratio of aspartate groups to isocyanate groups of 1.2:1 to 1:1.3, preferably 1.1:1 to 1:1.2 and more preferably 1.1:1.0 to 1.0:1.1.

The coating compositions are prepared by mixing the individual components together. Preparation of the binders is carried out solvent-free or in the presence of the solvents conventionally used in polyurethane or polyurea coatings. It is an advantage of the process according to the invention that the quantity of solvent used may be greatly reduced when compared with that required in conventional two-component systems.

Examples of suitable solvents include xylene, butyl acetate, methyl isobutyl ketone, methoxypropyl acetate, N-methyl pyrrolidone, Solvesso solvent, petroleum hydrocarbons, iso-butanol, butyl glycol, chlorobenzenes and mixtures of such solvents.

In the coating compositions to be used for the process according to the invention, the ratio by weight of the total quantity of binder components a) and b) to the quantity of solvent is about 40:60 to 100:0, preferably about 60:40 to 100:0.

The coating compositions to be used for the process according to the invention may also contain other auxiliary agents and additives conventionally used in polyurethane and polyurea coatings, in particular pigments, fillers, catalysts, leveling agents, antisettling agents, UV stabilizers and the like. Coating compositions containing pigments and/or fillers are especially suitable for the present invention due to the difficulty of removing all of the moisture from these additives.

For carrying out the process according to the invention, the coating compositions to be used according to the invention are applied as one or more layers to substrates by known methods such as spraying, brush coating, immersion or flooding or by means of rollers or doctor applicators. The process according to the invention is suitable for the formation of coatings on various substrates, e.g., metals, plastics, wood, cement, concrete or glass. The process according to the invention is particularly suitable for the formation of coatings on sheet steel, for example, for the manufacture of car bodies, machine trim panels, vats or containers. The substrates to be coated by the process according to the invention may be treated with suitable primers before the process according to the invention is carried out.

After the substrates exemplified above have been coated, the coatings may be cured at either ambient temperature, e.g., by air drying or so-called forced drying, or at elevated temperature.

The invention is further illustrated but is not intended to be limited by the following examples in which all parts and percentages are by weight unless otherwise specified.

EXAMPLES

Polyether 1

A polytetramethylene ether glycol having number average molecular weight of 2000 (available from DuPont as Terethane 1000).

Polyisocyanate 1

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Bayer Corporation as Desmodur N 3300).

Polyisocyanate 2

An uretdione and isocyanurate group-containing polyisocyanate prepared from 1,6-hexamethylene diisocyanate and having an isocyanate content of 22.1%, a content of monomeric diisocyanate of <0.1% and a viscosity at 25° C. of 200 mpa.s (available from Bayer AG as Desmodur N 3400).

Diaspartate 1

A diaspartate prepared from 2-methyl-1,5-pentane diamine and diethyl maleate (having an NH number of 244, an equivalent weight of 230 and a viscosity of 70 mP.s@25° C., available from Bayer Corp. as Desmophen NH 1220).

NCO Prepolymer 1

64.3 g (0.765 eq) of HDI were introduced into a round bottom flask fitted with stirrer, heater, nitrogen inlet, addition funnel and thermocouple. The temperature was raised to 60° C. and then a mixture of 187.5 g (0.387 eq) of polyether 1 was added via the addition funnel over a one hour period. The reaction was continued for an additional hour at 60° C. and held at room temperature for three days. The theoretical NCO content was 6.45%.

Aspartate Prepolymer 1

146.2 g (0.64 eq) of diaspartate 1 were introduced into a round bottom flask fitted with stirrer, heater, nitrogen inlet, addition funnel and thermocouple. 103.8 g (0.160 eq) of NCO prepolymer 1 were added via the addition funnel over a one hour period. The temperature was raised to 60° C. and the reaction was continued for an additional five hours at this temperature. The resulting product was a 56:44 mixture of the aspartate-terminated prepolymer and excess diaspartate, and had an amine number of 105.9 and a viscosity of 11,100 mP.s@25° C.

Preparation of Samples for Testing Shore Hardness, Tensile Properties and Gel Times Approximately forty grams of the aspartate component was weighed into a plastic cup. The polyisocyanate component was added to the aspartate component in amount sufficient to provide an equivalent ratio of isocyanate groups to aspartate groups of 1.05:1. The following table sets forth the weight ratio between diaspartate 1 and aspartate prepolymer 1. The polyisocyanate component is either polyisocyanate 1, polyisocyanate 2 or a blend of these polyisocyanates. The table sets forth the weight percent of polyisocyanate 1 in the mixture; the remainder is polyisocyanate 2.

The materials were vigorously stirred for 15 seconds and then poured onto a glass plate. A film was made on the glass plate by drawing out a thin film with a 15 mil draw down bar. The films were allowed to cure for 21 days at 25° C. and 50% R.H.

When the curing period was complete, the glass panels were immersed in tap water for about two hours. The film was lifted from the glass surface, patted dry with a paper towel and dusted with talc to prevent the polymers from sticking to themselves or other surfaces. The free films were stacked alternately with paper towels and allowed to dry overnight. Tensile and elongation were then determined. Tensile strength and percent elongation were determined on free films according to ASTM D 412. The results are set forth in the following table.

| % Polyiso 1 in mixture % Elongation | 100 | 75 | 50 | 25 | 0 |
|---|---|---|---|---|---|
| Aspartate Prep 1 | 74 | 106 | 154 | 185 | 232 |
| 50/50 blend of Asp Prep 1/Diasp 1 | 7 | 16 | 102 | 155 | 206 |
| 25/75 blend of Asp Prep 1/Diasp 1 | 3 | 6 | 143 | 155 | 156 |
| Diaspartate 1 | 3 | 3 | 8 | 98 | 168 |

The values from the table have been plotted in the FIGURE in which
Line 1 represents pure aspartate prepolymer 1;
Line 2 represents a 50/50 blend of aspartate prepolymer 1 and diaspartate 1;
Line 3 represents a 25/75 blend of aspartate prepolymer 1 and diaspartate 1; and
Line 4 represents pure diaspartate 1.

It can be seen that once the elongation begins to increase for a given resin, it increases proportionately with the functionality of the polyisocyanate for pure aspartate prepolymer 1, pure disaspartate 1 and the 50/50 blend of these aspartate resins. The FIGURE also demonstrates that as the amount of the prepolymer in each of the preceding resins decreases, the elongation also decreases for a given polyisocyanate functionality. Based on this data, it would be expected that the 25/75 blend would fall between the 50/50 blend and pure diaspartate 1. However, this is not the case. For certain blends of aspartate resins and isocyanate functionality, the elongation is surprisingly high and approaches the value for pure aspartate prepolymer 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A coating composition comprising
   a) 10 to 22% by weight, based on the weight of components a) and b), of an aspartate-terminated urea/urethane prepolymer that is the reaction product of
      i) an NCO prepolymer having a functionality of 1.8 to 2.2 and based on a linear or branched aliphatic diisocyanate and
      ii) a compound corresponding to formula I

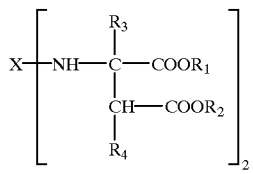

wherein
      X represents the residue obtained by removing the amino groups from a linear or branched aliphatic diamine,
      $R_1$ and $R_2$ may be identical or different and represent organic groups which are inert towards isocyanate groups at a temperature of 100° C. or less and
      $R_3$ and $R_4$ may be identical or different and represent hydrogen or organic groups which are inert towards isocyanate groups at a temperature of 100° C. or less,
   b) 78 to 90% by weight, based on the weight of components a) and b), of a compound corresponding to formula I, and
   c) a polyisocyanate adduct prepared from an aliphatic diisocyanate and having an average functionality of 2.8 to 3.1,
wherein components a), b) and c) are present in amounts sufficient to provide an equivalent ratio of aspartate groups to isocyanate groups of 1.2:1 to 1.0:1.3.

2. The composition of claim 1 wherein $R_1$ and $R_2$ represent a methyl, ethyl or butyl group and $R_3$ and $R_4$ represent hydrogen.

3. The composition of claim 1 wherein said NCO prepolymer comprises the reaction product of an aliphatic diisocyanate with a polyether diol.

4. The composition of claim 2 wherein said NCO prepolymer comprises the reaction product of an aliphatic diisocyanate with a polyether diol.

5. The composition of claim 1 which contains 11 to 19% by weight of component a) and 81 to 89% by weight of component b), wherein these percentages are based on the weight of components a) and b).

6. The composition of claim 2 which contains 11 to 19% by weight of component a) and 81 to 89% by weight of component b), wherein these percentages are based on the weight of components a) and b).

7. The composition of claim 3 which contains 11 to 19% by weight of component a) and 81 to 89% by weight of component b), wherein these percentages are based on the weight of components a) and b).

8. The composition of claim 4 which contains 11 to 19% by weight of component a) and 81 to 89% by weight of component b), wherein these percentages are based on the weight of components a) and b).

9. The composition of claim 1 wherein said polyisocyanate adduct is prepared from 1,6-hexamethylene diisocyanate and contains isocyanurate groups and uretdione groups.

10. The composition of claim 2 wherein said polyisocyanate adduct is prepared from 1,6-hexamethylene diisocyanate and contains isocyanurate groups and uretdione groups.

11. The composition of claim 3 wherein said polyisocyanate adduct is prepared from 1,6-hexamethylene diisocyanate and contains isocyanurate groups and uretdione groups.

12. The composition of claim 4 wherein said polyisocyanate adduct is prepared from 1,6-hexamethylene diisocyanate and contains isocyanurate groups and uretdione groups.

13. The composition of claim 5 wherein said polyisocyanate adduct is prepared from 1,6-hexamethylene diisocyanate and contains isocyanurate groups and uretdione groups.

14. The composition of claim 6 wherein said polyisocyanate adduct is prepared from 1,6-hexamethylene diisocyanate and contains isocyanurate groups and uretdione groups.

15. The composition of claim 7 wherein said polyisocyanate adduct is prepared from 1,6-hexamethylene diisocyanate and contains isocyanurate groups and uretdione groups.

16. The composition of claim 8 wherein said polyisocyanate adduct is prepared from 1,6-hexamethylene diisocyanate and contains isocyanurate groups and uretdione groups.

17. A substrate coated with the composition of claim 1.

* * * * *